United States Patent
McVicar et al.

(10) Patent No.: US 12,060,237 B2
(45) Date of Patent: Aug. 13, 2024

(54) APPARATUS FOR LOADING ARTICLES INTO A SHIPPING CONTAINER

(71) Applicant: Combilift, County Monaghan (IE)

(72) Inventors: Martin McVicar, County Monaghan (IE); Robert Moffett, County Monaghan (IE); Mark Whyte, County Monaghan (IE)

(73) Assignee: Combilift, County Monaghan (IE)

( * ) Notice: Subject to any disclaimer, the term of this patent is extended or adjusted under 35 U.S.C. 154(b) by 352 days.

(21) Appl. No.: 17/050,027

(22) PCT Filed: Apr. 15, 2019

(86) PCT No.: PCT/EP2019/059638
§ 371 (c)(1),
(2) Date: Oct. 23, 2020

(87) PCT Pub. No.: WO2019/206710
PCT Pub. Date: Oct. 31, 2019

(65) Prior Publication Data
US 2021/0070561 A1 Mar. 11, 2021

(30) Foreign Application Priority Data
Apr. 25, 2018 (IE) .................................. 2018/0132

(51) Int. Cl.
*B65G 67/20* (2006.01)
*B66F 9/04* (2006.01)

(52) U.S. Cl.
CPC ............. *B65G 67/20* (2013.01); *B66F 9/04* (2013.01); *B65G 2814/0302* (2013.01)

(58) Field of Classification Search
CPC .... B65G 2814/0302; B65G 67/20; B66F 9/04
USPC ........................................................ 414/400
See application file for complete search history.

(56) References Cited

U.S. PATENT DOCUMENTS

| 3,186,566 A | * | 6/1965 | Spinanger | B65G 67/20 414/400 |
| 3,664,533 A | | 5/1972 | Hand | |
| 3,952,887 A | * | 4/1976 | Lutz | B65G 67/20 198/774.4 |
| 4,537,554 A | * | 8/1985 | Collins, Jr. | B65G 67/20 414/373 |

(Continued)

FOREIGN PATENT DOCUMENTS

WO 95/23105 8/1995

OTHER PUBLICATIONS

International Search Report issued in co-pending international application No. PCT/EP2019/059638 on Jul. 4, 2019.

*Primary Examiner* — Mark C Hageman
(74) *Attorney, Agent, or Firm* — Whiteford, Taylor & Preston, LLP; Gregory M. Stone

(57) ABSTRACT

An apparatus (100) for loading a shipping container (101), comprising a transfer plate (103) having a series of holes (201, 202) therein and configured to slide, together with an article thereon, into and out of the shipping container (101), and a transfer means (104) positioned underneath the transfer plate (103) and configured to engage with the holes in the transfer plate and to retract or extend after engagement with the holes to pull the transfer plate into and out of the shipping container.

14 Claims, 7 Drawing Sheets

(56) References Cited

U.S. PATENT DOCUMENTS

| | | | | |
|---|---|---|---|---|
| 7,695,235 B1* | 4/2010 | Rallis | ................... | B65G 47/54 |
| | | | | 414/400 |
| 10,428,577 B2* | 10/2019 | Viinonen | ............... | B65G 67/20 |
| 10,781,061 B2* | 9/2020 | Huang | ................ | B65G 67/20 |
| 10,865,057 B2* | 12/2020 | Viinonen | ............... | B65G 67/20 |
| 11,059,684 B2* | 7/2021 | Pakkanen | .............. | B65G 67/20 |
| 2011/0274532 A1* | 11/2011 | Poutanen | .............. | B65G 67/20 |
| | | | | 414/800 |

* cited by examiner

APPARATUS FOR LOADING ARTICLES INTO A SHIPPING CONTAINER

TECHNICAL FIELD

This invention relates to an apparatus for loading articles, using a sliding plate, into a shipping container through an opening at one end of the shipping container.

BACKGROUND ART

In loading various articles into shipping containers, such as freight containers, wagons, trucks or the like, it is often difficult to transfer the articles into the shipping in such a way that on the one hand, the space is utilized as well as possible and on the other hand, the articles are not damaged during loading and transportation. This is because the shipping container is generally open at one end and all articles must enter through this end. A number of apparatuses have been developed for loading shipping containers through an opening at one end.

An example of such an apparatus is disclosed in WO 9523105. This prior art document discloses a method and apparatus for loading products to be transported into a cargo space. The apparatus disclosed utilizes a transfer plate, on top of which the load is first formed. Next, the load together with the transfer plate is pushed into the cargo space, after which the transfer plate is pulled out from under the load. The load is supported during the pulling. In the method, the products are first loaded onto a transfer plate that is outside the cargo space and can be pushed into the cargo space from a side of the cargo space that is entirely open. After this, the products are transferred to the interior of the cargo space by pushing the transfer plate in over the bottom of the cargo space. Finally, the products are supported from the open side and the transfer plate is pulled out from between the bottom of the cargo space and the products. In the apparatus, there is a frame supporting a movable transfer plate. The apparatus also includes transfer means for moving the transfer plate and the products into the cargo space, and for pulling the transfer plate away from between the bottom of the cargo space and the products.

A drawback with such an apparatus is that significant force is applied to one end of the transfer plate as it is pushed into the cargo space. All of the force required to push the load into the container is applied to one end, which can result in buckling of the transfer plate with the load thereon. To accommodate the forces applied to the end of the transfer plate, this prior art transfer plate is thickened at one end in a wedge-like manner.

This prior art apparatus also requires a support or barrier that presses against the articles at one end of the transfer plate after the transfer place has entered the cargo space. In particular, the articles are pushed with supporting cylinders further inside the transport space, which can cause damage to the articles.

DISCLOSURE OF THE INVENTION

The invention provides an apparatus for loading a shipping container, comprising: a transfer plate having a series of holes therein and configured to slide, together with articles to be loaded, into and out of the shipping container; and a transfer means positioned underneath the transfer plate and configured to engage with the holes in the transfer plate and to retract ore extend after engagement with the holes to pull the transfer plate into or out of the shipping container.

By providing the transfer means in such a manner, longitudinal buckling forces are minimized. That is, unlike prior art apparatuses, all the force is not applied to one end of the transfer plate to push the transfer plate into the shipping container. In such a configuration buckling of the transfer plate is not uncommon.

Preferably, the transfer plate comprises two series of holes and the transfer means comprises first and second sections which are each extendable and retractable for engagement with a respective series of holes.

Preferably, wherein first and second sections are synchronised such that while one of the sections extends, the other section retracts.

The use of two sections, which engage with a different series of holes in the transfer plate allows the transfer plate to be quickly and efficiently moved into the shipping container. The first and second sections operate together such that one section is always working i.e., acting to move the transfer plate.

Preferably, the transfer means comprises pins configured to extend and retract into the holes in the transfer plate. The extension and retraction of the pins allows the transfer means to engage with the underside of the transfer plate. This is not achievable in the prior art wherein only one end of the transfer plate is engageble.

The apparatus may further comprise a barrier gate having an offset section, the barrier configured to swing over the transfer plate and the offset portion holding the article a predetermined distance within the shipping container while the transfer plate is moved out of the container.

Unlike prior art systems, the barrier gate holds loaded articles a predetermined distance away from the opening of the container. The articles are not pushed by the barrier but simply held in place. Once the barrier is opened, the doors of the shipping container can be easily closed as there is there is the predetermined distance between the opening of the container and the loaded articles.

BRIEF DESCRIPTION OF THE DRAWINGS

The invention will now be illustrated by the following description of embodiments thereof, given by way of example only, with reference to the accompanying drawings, in which.

DETAILED DESCRIPTION OF PREFERRED EMBODIMENTS

Figure 1:
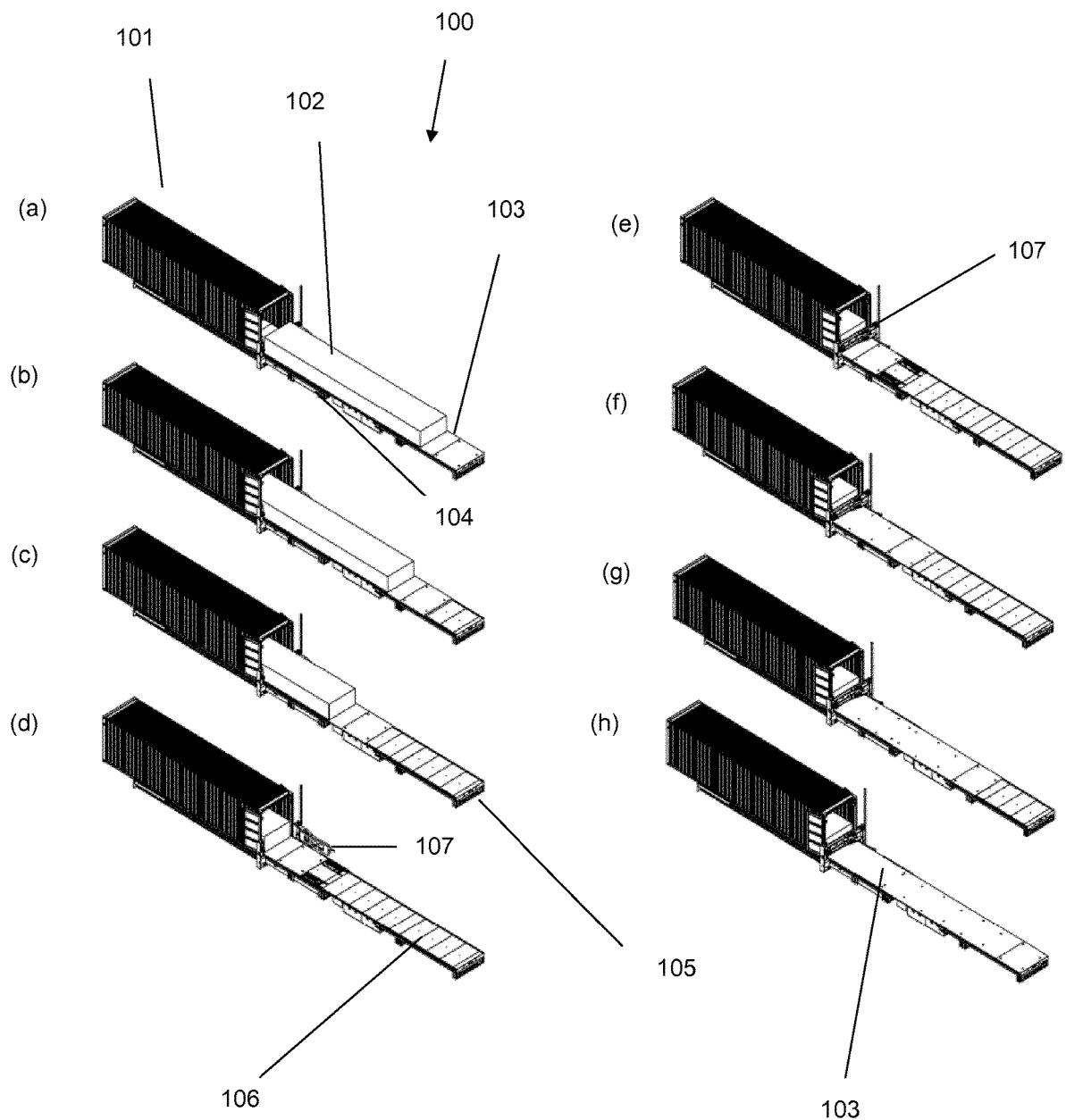
FIG. 1 provides perspective views of an apparatus for loading a shipping container, depicted at different stages of operation.

Referring to FIG. 1 an apparatus 100 for loading a shipping container 101 is shown in perspective view.

In particular, FIG. 1(a) shows the apparatus 100 with an article 102 for loading into the shipping container 101 thereon. Specifically, the article 102 is loaded onto a transfer plate 103, which is configured to slide into the container 101. A transfer means 104, positioned underneath the transfer plate 103 is configured to engage with the transfer plate and move it in and out of the shipping container 101. The internal working of the transfer means 104 will be described in more detail hereinafter.

Although a single article 102 is shown, any number of articles can be loaded onto the transfer plate 103. Furthermore, any suitable means known to those skilled in the art can be used to load an article(s) onto the transfer plate 103.

In FIG. 1(b), it can be seen that the transfer plate 103 is moved partially into the shipping container 101 with the article 102 thereon. That is, the transfer means 104 engages the transfer plate 103 to pull it into the shipping container 101. The transfer plate 103 continues to move into the shipping container in FIGS. 1(c) and 1(d).

It can be seen that the transfer plate 103 and transfer means 104 are comprised within a housing or frame 105. The shipping container 101 can also be positioned on this frame 105 or positioned against the frame 105 (while on a body of a lorry or another frame etc.). In the preferred embodiment, the apparatus is configured such that the transfer means 104 in positioned adjacent the opening of the container 101. In this manner the transfer means 104 pull the transfer plate into the shipping container as opposed to pushing it from a distance far removed from the container.

As the transfer plate 103 is pulled into the container 101, it can be seen that the transfer plate slides on an under plate 106. This under plate or wear plate can be comprised of any suitable material so long as it allows the transfer plate to freely and easily slide thereon. Nylon, steel, bronze etc. are suitable materials.

Turing to FIG. 1(e), the article 102 has been completely loaded into the shipping container. A barrier gate or rear barrier 107, which was previously in the open position (FIGS. 1(a)-(d)), is then swung across the transfer pate 103 to hold the article 102 in place as the transfer plate 103 is pulled from the shipping container 101. The barrier gate 107 includes an offset portion, which holds the article a predefined distance within the shipping container 101. As will be explained in more detail herein after, this keeps the article 102 away from the opening of the shipping container and allows the doors thereof to close once loading is complete.

It will be appreciated that a portion of the transfer plate 103 never enters the container 101 as a portion of the transfer plate must always be engaged by the transfer means 104, which is part of the apparatus 100 outside the shipping container 101.

FIGS. 1(e) to (h) shows the progression of the transfer plate 103 as is pulled by the transfer means 104 from the shipping container 101. The barrier gate 107 remains in place (closed) until the transfer plate is fully retracted or removed from the shipping container.

Once the transfer plate 103 is completely removed from the shipping container 101, the barrier gate 107 can be opened and the doors of the shipping container closed. The shipping container is then ready for shipping with the article securely loaded therein.

Figure 2:
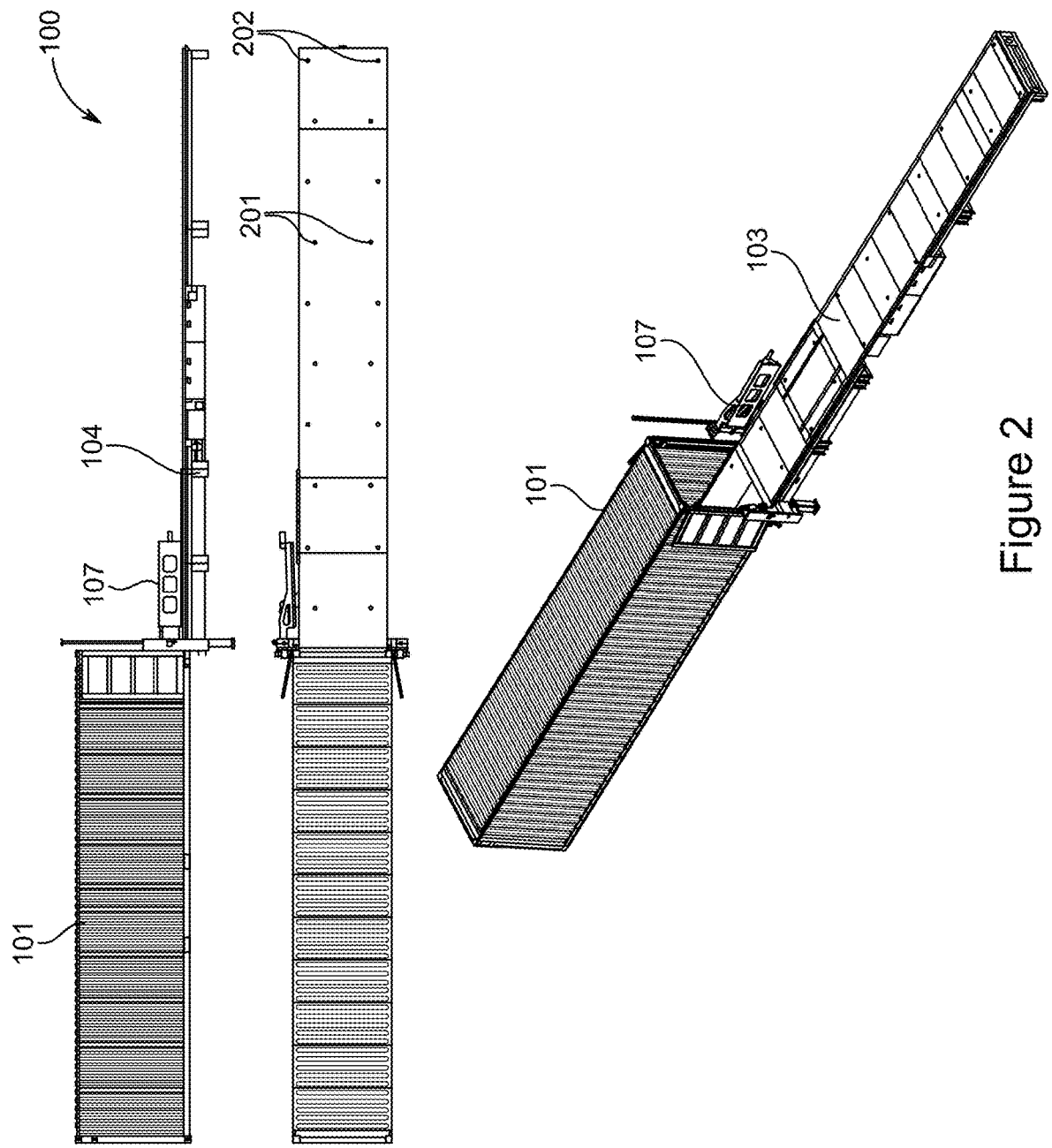
FIG. 2 provides further views of the apparatus for loading a shipping container in operation without any article thereon.

FIG. 2 shows the apparatus 100 for loading a shipping container 101 without any article thereon. The transfer plate 103 is fully outside the shipping container 101. It can be seen that the transfer plate 103 has a first series of holes 201 and a second series of holes 202 that run along the length of transfer plate 103. As will be explained in more detail hereinafter, each series of holes is engaged by a different section of the transfer means 104 to pull the transfer plate in and out of the shipping container. The second series of holes 202 is offset from the first series of holes 201 i.e., these holes are slightly closer to a centre line of the transfer plate. Having two series of holes configured as shown is not essential and a single series of holes (at each side of transfer plate) in line with each other would be sufficient to allow the transfer plate 103 to be moved in and out of the container 101 by the transfer means 104. Alternatively, one or both series of holes could be placed more centrally than shown in the figures.

Figure 3:
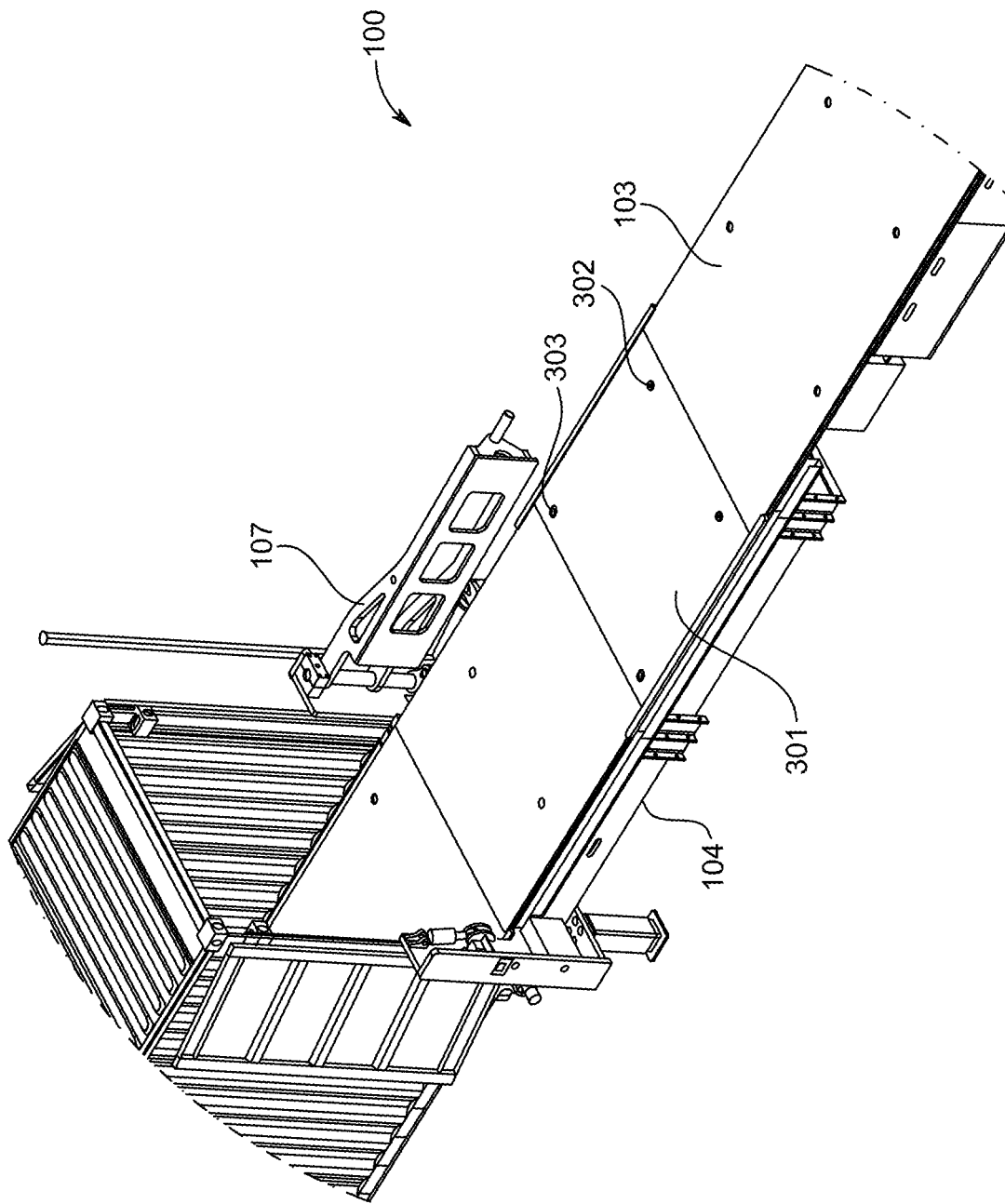
FIG. 3 is a more detailed view of a portion of the apparatus for loading a shipping container.

Turning to FIG. 3, this shows a more detailed view of a portion of the apparatus 100 for loading a shipping container. Specifically, the transfer means 104 is shown underneath the transfer plate 103. Although the internal components of the transfer means 104 cannot be seen, the transfer means comprises hydraulic rams 301, which extend and retract in order for the transfer means to engage with holes 201, 202 in transfer plate 103. Once a section of the transfer means 104 is engaged with the transfer plate 103, it can pull it into the container 101 or out of the container 101. The transfer means 104 also comprises retractable and extendable pins 302, 303. As will be explained in more detail hereinafter, once a section of the transfer means 104 is positioned correctly, pins extend into the holes 201, 202 such that the transfer means can hold or grip the transfer plate 103. The pins 302, 303 extend only as far as the top surface of the transfer plate. To extend any further would risk damaging any article(s) 101 positioned on the transfer plate 103 for loading.

Figure 4:
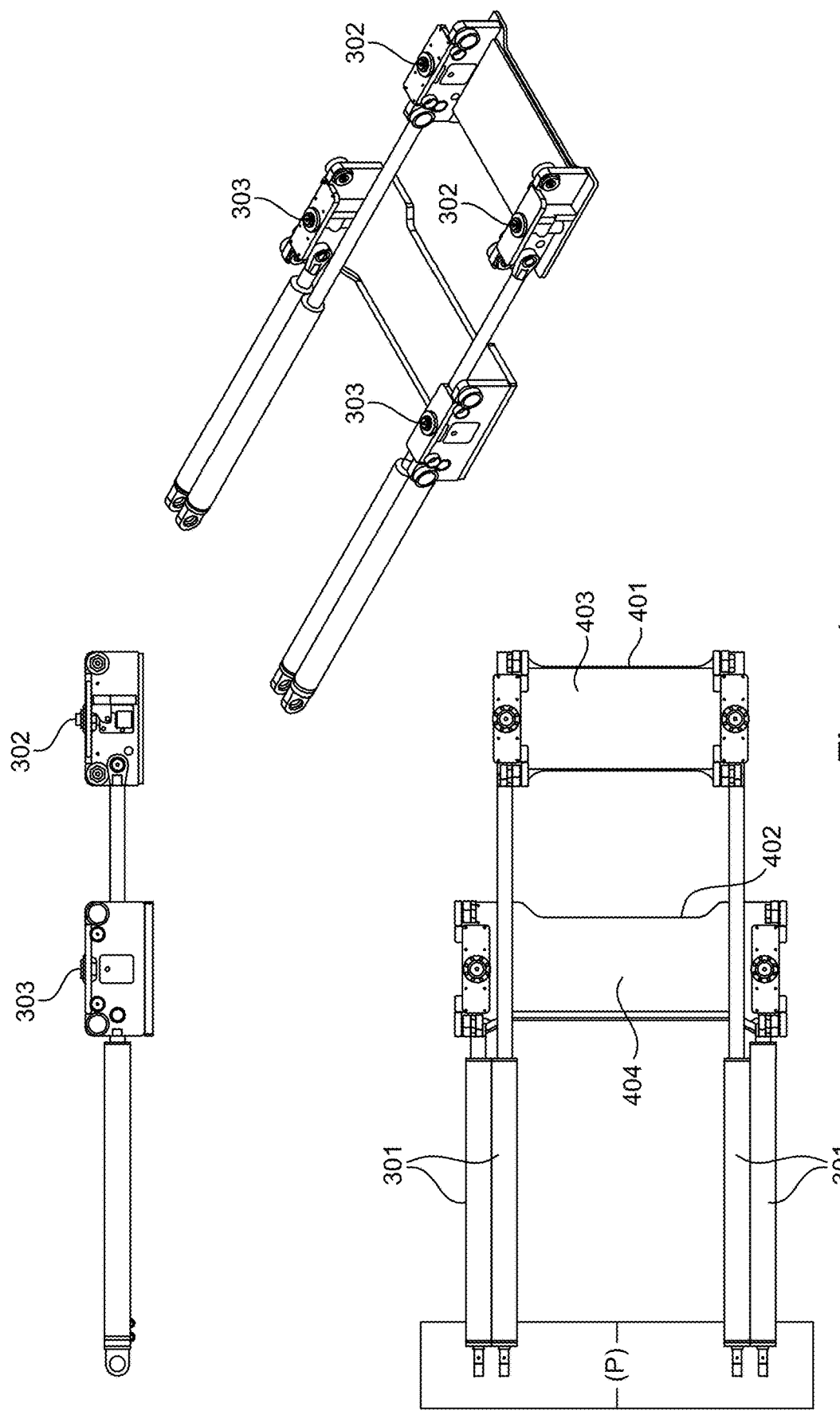
FIG. 4 provides a number of views of the internal components of the apparatus for loading a shipping container.

With reference to FIG. 4, this provides a number of views of the internal components of the apparatus 100. Specifically, the internal components of the transfer means 104 are shown.

In the exemplary embodiment, the transfer means 104 comprises two sections 401, 402. Each section 401, 402 comprises two hydraulic cylinder 301, a support bracket 403, 404 and two hydraulic pins 302, 303. When one section 401, 402 is extended, the other section 401, 402 is retracted at the same time. That is, the hydraulic rams of each section are synchronised e.g., if the rams 301 of one section are 75% extended, the rams 301 of the other section are 25% extended. Pins 303 are both extended at the same time and withdrawn at the same time. The same is true of pins 302.

An exemplary operation of the transfer means 104 to pull the transfer plate 103 into the shipping container will now be described. First section 401 is extended (using its hydraulic rams 301) away from the shipping container 101. While extending, the pins 302 are in a withdrawn position. When the section 401 is fully extended, the pins should be positioned beneath two holes 201 (in one series of holes) in the transfer plate 103. The pins 302 are then extended to engage with the transfer plate. That is, the pins 302 extend into the holes 201 in the transfer plate. The first section 401 is then retracted towards and since the pins are extended into the holes 201, the transfer plate is pulled in the direction of retraction i.e., into the shipping container. Once the first section 401 is fully retracted, the pins 302 are retracted and the first section 401 is extended to repeat the same steps.

The reverse operation as that described in the pervious paragraph is used to pull the transfer plate out of the shipping container. That is, instead of rams retracting to pull the transfer plate into the container, the rams extend to pull the transfer plate out of the shipping container.

Conceivably, the reverse operation as that described above could also be used to pull articles into the shipping container. That is, instead of rams retracted to pull items into the container, the rams could extend to pull the transfer plate into the shipping container.

The skilled person will appreciate that two sections 401, 402 for the transfer means are not essential. That is, a single section 401 can be used to pull the transfer plate 103 into the container. However, by having a second section 402, in synchronous with the first section 401, the transfer plate 103 can be moved in and out of the container more speedily.

The second section engages with a second series of holes 202 (located closer to the outside of the transfer plate). At any given time, one of the sections 401, 402 is engaging the transfer plate i.e., the pins 302, 303 of one of the sections 401, 402 are extending and the transfer plate is being moved by one of the sections. There is a brief pause in movement as one set of pins is extended and the other set of pins is withdrawn. This brief pause may be used to centre the pins within the holes. That is, the skilled person will appreciate that repeated contact between the pins and the holes in the transfer plate will lead to wear on the holes, perhaps distorting their shape etc. To minimise this, before retracting the pins, the apparatus may be configured to move the pins a predetermined distance away from the edge of the holes e.g., 5 mm, before retracting the pins. Specifically, the section 401, 402 is moved a predetermined distance using hydraulic cylinders 301. In this manner, the pins do not contact the sides of the holes 201, 202 when being retracted and wear on the holes is reduced.

The skilled person will appreciate that the force required to pull the transfer plate out of the shipping container is greater than that required to pull the transfer plate into the container. This is because, when pulling the transfer plate out, there is friction above and below the plate from the articles thereon and from the floor of the shipping container. It may be preferable to configure the apparatus such that when the transfer plate is being pulled out of the container, oil is pumped to the full bore side of the hydraulic cylinders to provide more force. When pulling the transfer plate into the container, the oil may be provided to the annulus side of the hydraulic rams.

Figure 5:
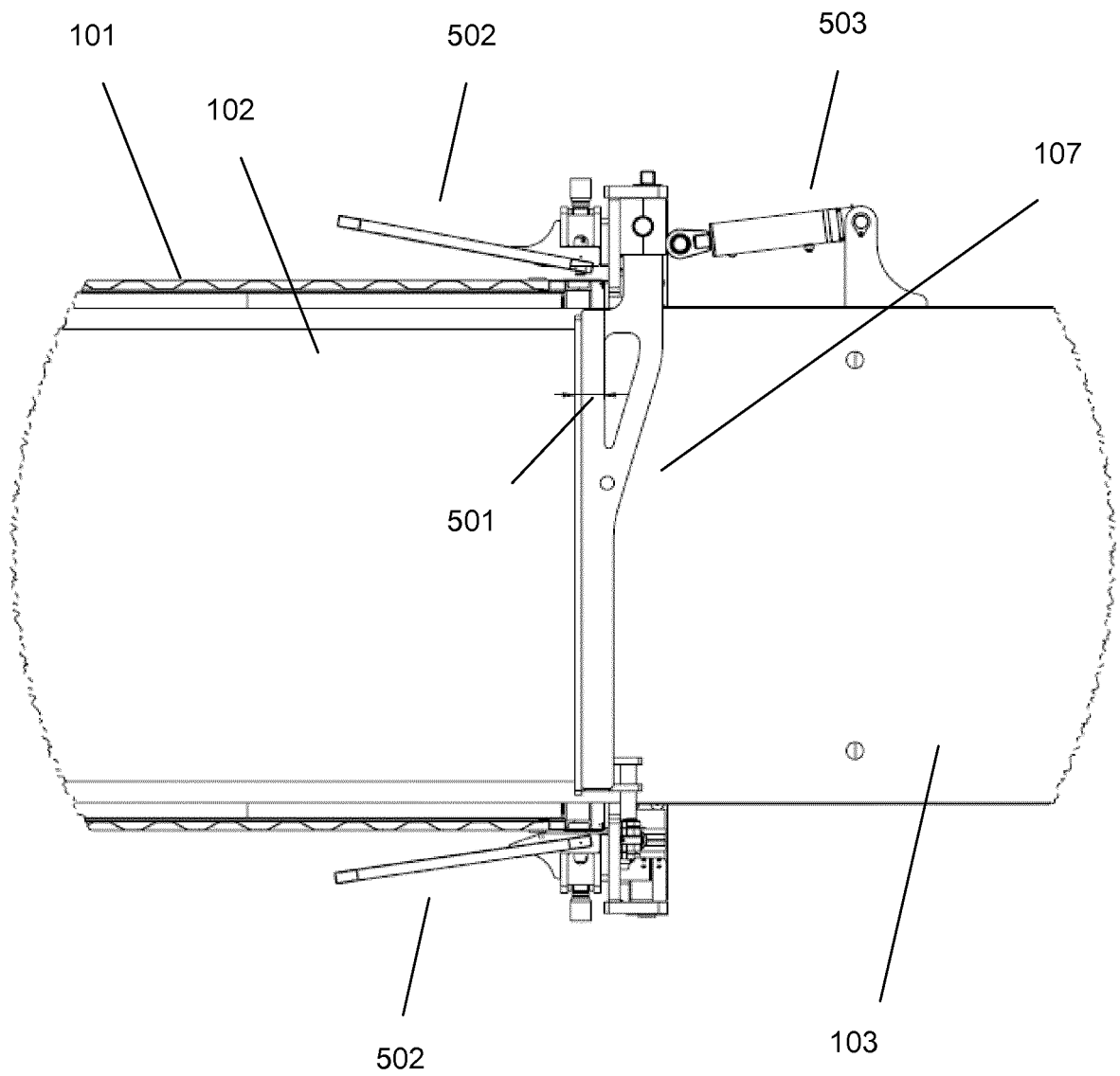
FIG. 5 provides an overhead view of a gate barrier, which is part of the apparatus for loading a shipping container.

Turning to FIG. 5, provides an overhead view of a barrier gate, which is part of the apparatus for loading a shipping container. In this figure, it can be seen that the barrier gate 107 has an offset portion such that any article(s) loaded into the container 101 is held a predetermined offset or distance 501 inside the container 101 (a predetermined distance away from the opening in the container). In this manner, as the transfer sheet 103 is pulled out of the container 101, the article 102 is held inside the container a predetermined distance away from the back of the container. This ensures that the article 102 does not protrude out of the back of the container and prevent the doors 502 of the container from closing.

A hydraulic cylinder 503 is used to swing the gate barrier 107 about a fulcrum/hinge in order to open and close the gate barrier as required. Unlike prior art systems, the hydraulic cylinder 503 is not used to apply any force to the loaded article 102 or to push it further into the container 101, which can result in damage to the loaded article 102.

Figure 6A:
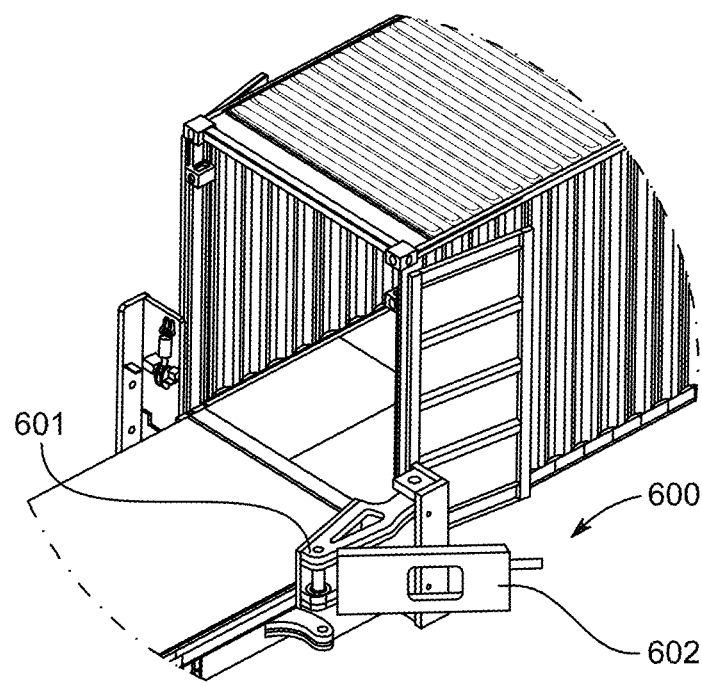
FIG. 6(a) and 6(b) provide views of a folding barrier gate, which is part of the apparatus for loading a shipping container.
Figure 6B:
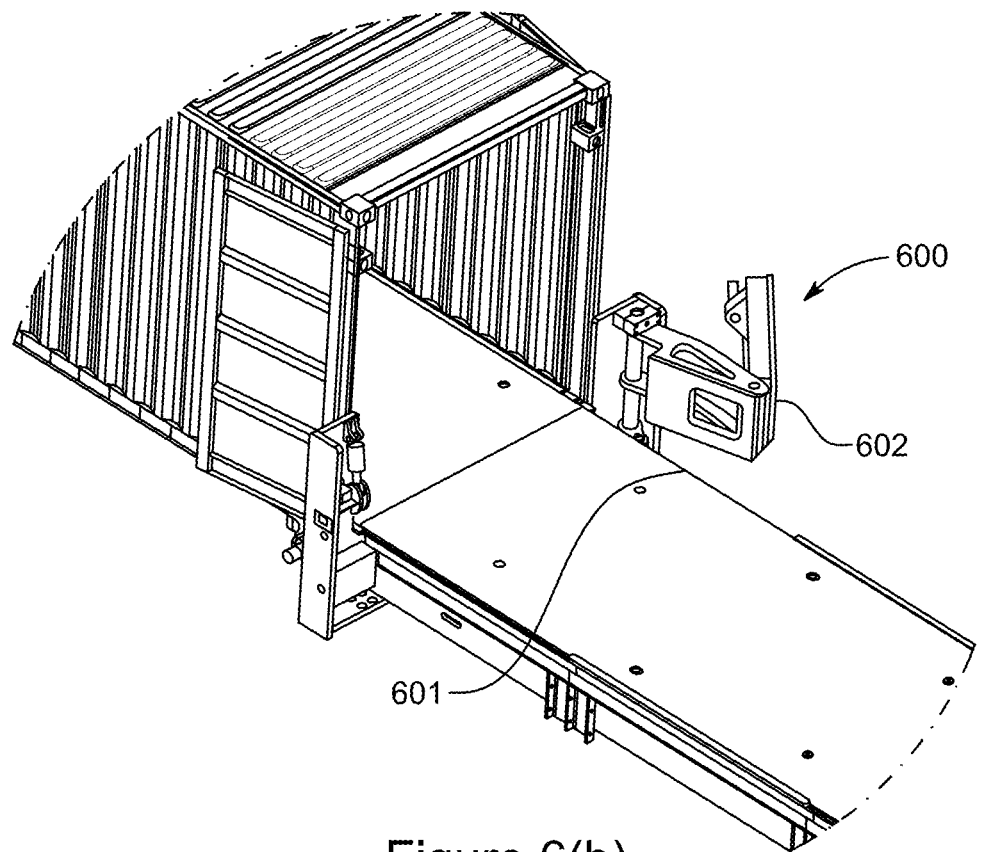

With reference to FIGS. 6(*a*) and 6(*b*), another embodiment of barrier gate 600 is shown. The barrier gate of this embodiment comprises two sections. The second section 602 can be folded back with respect to the first section 601 to reduce the length of the barrier gate 600. In this manner, articles can be loaded (e.g., with a forklift) on the transfer plate 103 from both sides without having barrier gate blocking a large portion of the transfer plate 103. The transfer plate does not have to pulled out of the container as far (when compared to the previously described embodiment of the barrier gate) in order to load/unload from both sides. This keeps the overall length as short as possible.

It can be seen from FIGS. 6(*a*) and 6(*b*) that a hinge joins the first section 601 to the second section 602 of the barrier gate. A hydraulic cylinder moves the second section 602 with respect to the first section 601. That is, the hinge acts as fulcrum about which the second section can rotate when moved by the actuation of the hydraulic cylinder.

Figure 7:
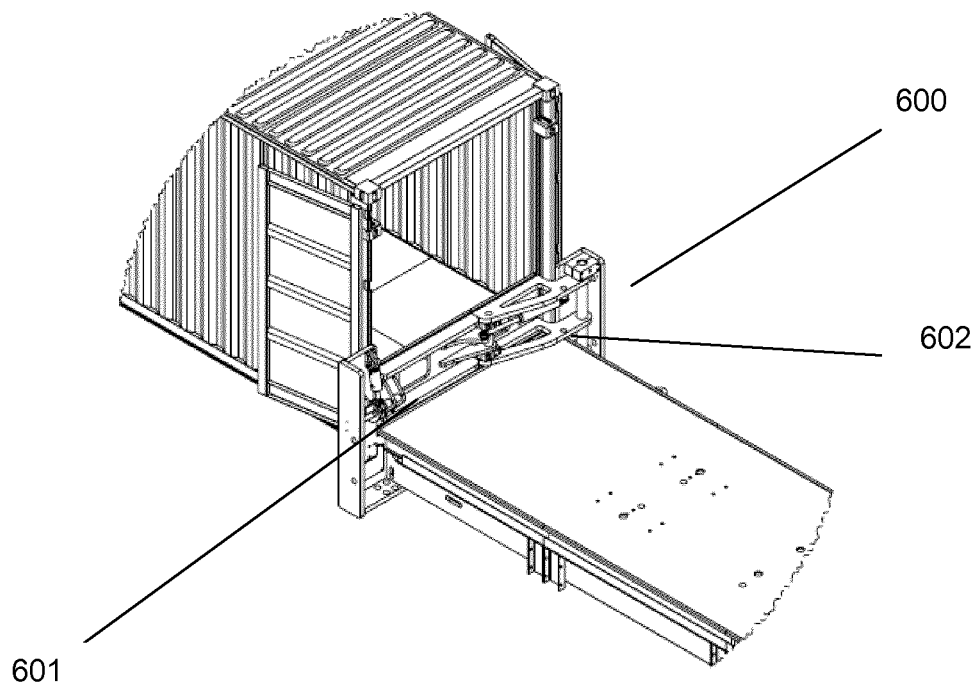
FIG. 7 shows the barrier gate of FIGS. 6(a) and 6(b) in a closed position.

In FIG. 7, the barrier gate 600 is shown in the closed position wherein it functions in the same manner as the previously described embodiment.

The invention is not limited to the embodiments described herein which may be varied within the scope of the claims that follow.

The invention claimed is:

1. An apparatus for loading a shipping container, comprising:
    a transfer plate having a series of holes therein and configured to slide, together with an article thereon, into and out of the shipping container; and
    first and second a transfer sections positioned underneath the transfer plate and configured to engage with the holes in the transfer plate and to retract or extend after engagement with the holes to pull the transfer plate into and out of the shipping container.

2. The apparatus according to claim 1 wherein the transfer plate comprises two series of holes and the first and second transfer sections are each extendable and retractable for engagement with a respective series of holes.

3. The apparatus according to claim 1 wherein the two series of holes are offset from each other.

4. The apparatus according to claim 1 further comprising an under plate on which the transfer plate can slide when pulled.

5. The apparatus according to claim 1 further comprising a barrier gate having an offset section, the barrier configured to swing over the transfer plate and the offset portion holding the article a predetermined distance within the shipping container while the transfer plate is pulled out of the container.

6. The apparatus according to claim 5 wherein the barrier gate comprises a first section and a second section and is configured such that the second section can fold with respect to the first section thereby reducing the length of the barrier gate.

7. The apparatus of claim 6 wherein the barrier gate comprises a hinge joining the first section to the second section, the hinge allowing the second section to fold onto the first section.

8. The apparatus of claim 7 wherein the barrier gate further comprises a hydraulic cylinder which moves the second section with respect to the first section.

9. An apparatus for loading a shipping container, comprising:
    a transfer plate having a series of holes therein and configured to slide, together with an article thereon, into and out of the shipping container; and
    first and second transfer sections positioned underneath the transfer plate and configured to engage with the holes in the transfer plate and to retract or extend after engagement with the holes to pull the transfer plate into and out of the shipping container;
    wherein the first and second transfer sections are synchronized such that while one of the transfer sections extends, the other transfer section retracts.

10. An apparatus for loading a shipping container, comprising:
- a transfer plate having a series of holes therein and configured to slide, together with an article thereon, into and out of the shipping container; and
- first and second transfer sections positioned underneath the transfer plate, the wherein the first and second transfer sections comprise pins configured to extend and retract from into the holes in the transfer plate to pull the transfer plate into and out of the shipping container;
- wherein the first and second transfer sections are configured such that the pins extend to be flush with the surface of the transfer plate on which the article is placed.

11. An apparatus for loading a shipping container, comprising:
- a transfer plate having a series of holes therein and configured to slide, together with an article thereon, into and out of the shipping container; and
- first and second transfer sections positioned underneath the transfer plate,
- wherein the first and second transfer sections comprise pins configured to extend and retract from into the holes in the transfer plate to pull the transfer plate into and out of the shipping container;
- wherein the apparatus is configured to move the pins a predetermined distance away from the edge of the hole before retracting the pins.

12. An apparatus for loading a shipping container, comprising:
- a transfer plate having a series of holes therein and configured to slide, together with an article thereon, into and out of the shipping container; and
- first and second transfer sections positioned underneath the transfer plate, each of the first and second transfer sections further comprising two hydraulic cylinders connected by a support bracket, and each of the first and second transfer sections being configured to engage with the holes in the transfer plate and to retract or extend after engagement with the holes to pull the transfer plate into and out of the shipping container.

13. The apparatus according to claim 12 wherein the hydraulic cylinders of the first section are synchronized with the hydraulic cylinders of the second section such that if the cylinders of the first section are extended, the cylinder of the second section are proportionally retracted.

14. The apparatus according to claim 12 wherein oil is pumped to the full bore side of the hydraulic cylinders to provide more force when pulling the transfer plate out of container and oil is provided to the annulus side of the hydraulic cylinders when pulling the transfer plate into the container.

* * * * *